United States Patent [19]
Seymour

[11] Patent Number: 5,967,050
[45] Date of Patent: Oct. 19, 1999

[54] MARKLESS COLOR CONTROL IN A PRINTING PRESS

[75] Inventor: John C. Seymour, Jefferson, Wis.

[73] Assignee: Quad/Tech, Inc., Sussex, Wis.

[21] Appl. No.: 09/165,653

[22] Filed: Oct. 2, 1998

[51] Int. Cl.$^6$ .............................. B41F 31/05; G06K 9/00
[52] U.S. Cl. ........................................... 101/484; 101/365
[58] Field of Search ..................................... 101/365, 181, 101/483, 484, 485, 350.1, 350.3; 250/559.04, 559.05, 559.08, 559.07, 559.02, 559.39, 559.44; 356/394, 429; 395/108, 109, 106; 358/448, 534–536; 382/162, 164, 165

[56] References Cited

U.S. PATENT DOCUMENTS

| | | | |
|---|---|---|---|
| 4,439,038 | 3/1984 | Mactaggart | 356/408 |
| 4,488,808 | 12/1984 | Kato | 356/73 |
| 4,649,502 | 3/1987 | Keller et al. | 364/519 |
| 4,660,159 | 4/1987 | Ott | 364/526 |
| 4,665,496 | 5/1987 | Ott | 364/526 |
| 4,881,182 | 11/1989 | Hank et al. | 364/519 |
| 4,967,379 | 10/1990 | Ott | 364/526 |
| 4,975,862 | 12/1990 | Keller et al. | 364/526 |
| 4,992,963 | 2/1991 | Funt et al. | 364/526 |
| 5,130,935 | 7/1992 | Takiguchi | 364/526 |
| 5,182,721 | 1/1993 | Kipphan et al. | 364/526 |
| 5,224,421 | 7/1993 | Doherty | 101/211 |
| 5,357,448 | 10/1994 | Stanford | 364/526 |
| 5,460,090 | 10/1995 | Pfeiffer et al. | 101/365 |

*Primary Examiner*—J. Reed Fisher
*Attorney, Agent, or Firm*—Michael Best & Friedrich LLP

[57] ABSTRACT

The invention provides a method for controlling a plurality of ink control devices on a printing press, wherein the press operates to repetitively print an image on a substrate. The ink control devices each control the amount of ink supplied to a respective ink key zone on the substrate. The method includes the step of measuring color values for a plurality of areas of a selected image printed on the substrate to produce an acquired image array. Next, the acquired image array is aligned with a target image array comprised of target color values for the plurality of areas. The acquired image array is compared to the target image array on a pixel by pixel basis. A matrix equation is determined that links ink control device adjustments to changes in color values of the image printed on the substrate via sensitivity factors for each of the plurality of pixels. A least squares solution to the matrix equation is obtained to determine ink adjustments for each ink key zone. The ink adjustments are communicated to the ink control devices.

14 Claims, 6 Drawing Sheets

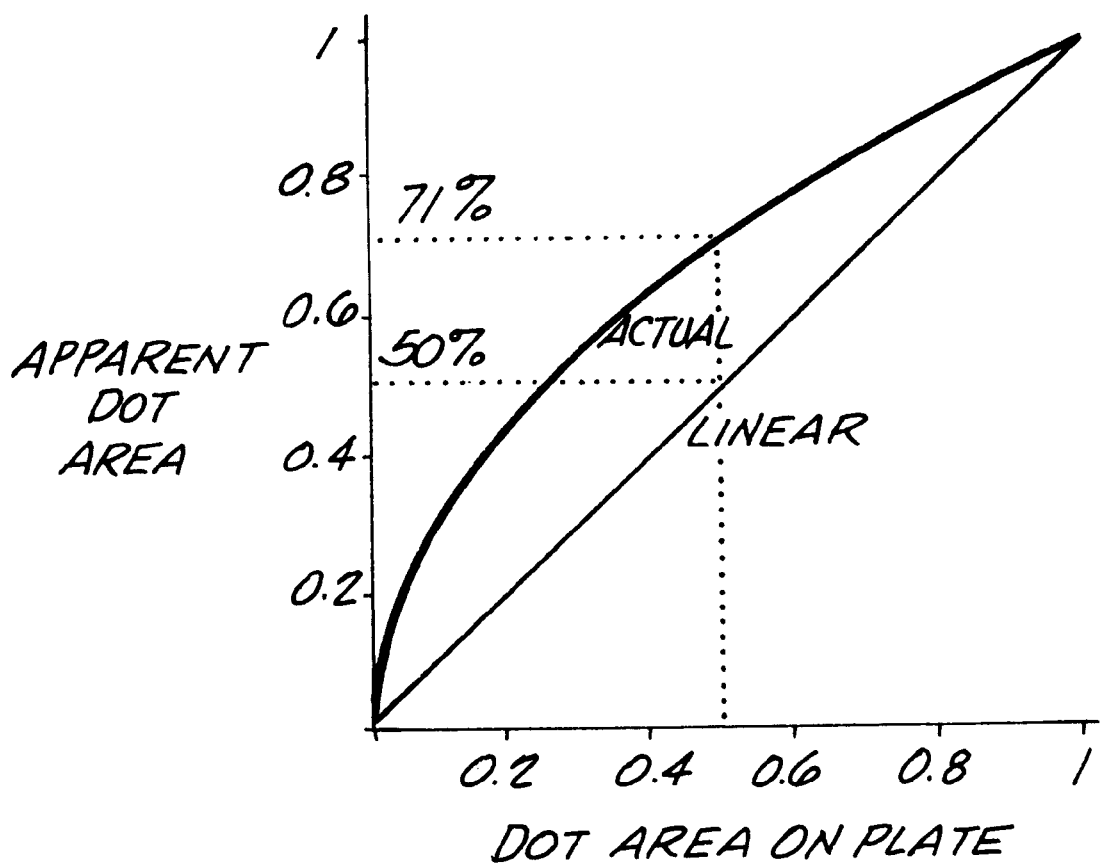

MARKLESS COLOR CONTROL IN A PRINTING PRESS

FIELD OF THE INVENTION

The present invention relates generally to a system and method for controlling the ink feed in a web-offset printing press in order to achieve and maintain desired color quality of an image printed on a web. More particularly, the invention relates to a markless system for controlling the ink feed that uses an imaging device such as a video camera to obtain color values for a plurality of areas of the image printed on the web.

BACKGROUND OF THE INVENTION

A web-offset printing press includes an inking assembly for each color of ink used in the printing process. Each inking assembly includes an ink reservoir as well as a segmented blade disposed along the outer surface of an ink fountain roller. The amount of ink supplied to the roller train of the press and ultimately to a substrate such as paper is adjusted by changing the spacing between the edge of the blade segments and the outer surface of the ink fountain roller. The position of each blade segment relative to the ink fountain roller is independently adjustable by movement of an ink control device such as an adjusting screw, or ink key, to thereby control the amount of ink fed to a corresponding longitudinal strip or ink key zone of the substrate. The term "ink control device" is intended to include any device that controls the amount of ink fed to a corresponding longitudinal strip or zone of the substrate.

Typically, ink is also spread laterally from one longitudinal zone to adjacent zones due to the movement of vibrator rollers, which oscillate in a lateral direction relative to the substrate. The amount of ink on the ink fountain roller itself is also adjustable by changing the angle through which the ink fountain roller rotates each stroke. Typically, this occurs by adjusting a ratchet assembly, as is known in the art.

While the press is running, it is common for a press operator to continually monitor the printed output and to make appropriate ink key adjustments in order to achieve appropriate quality control of the color of the printed image. For example, if the color in a zone is too weak, the operator adjusts the corresponding ink key to allow more ink flow to that zone; if the color is too strong, the corresponding ink key is adjusted to decrease the ink flow. During operation of the printing press, further color adjustments may be necessary to compensate for changing press conditions, or to account for the personal preferences of the customer.

The above-described visual inspection techniques used in connection with ink key presetting and color control are inaccurate, expensive, and time-consuming. Further, since the required image colors are often halftones of ink combined with other ink colors, such techniques also require a high level of operator expertise.

Methods other than visual inspection of the printed image are also known for monitoring color quality once the press is running. Quality control of color printing processes can be achieved by measuring the optical density of a test target image. Optical density of various points of the test target image can be measured by using a densitometer or scanning densitometer either off-line or on-line of the web printing process. Typically, optical density measurements are performed by illuminating the test target image with a light source and measuring the intensity of the light reflected from the image. Optical density (D) is defined as:

$$D = -\log_{10}(R) \quad (E1)$$

where:
R is the reflectance, defined as the ratio of reflected light intensity to incident light intensity.

The test target image that is measured is often in the form of a color bar comprised of individual color patches. The color bar typically extends the width of the web. Typically, the patches include solid patches and halftone patches for each of the primary ink colors, as well as a few solid overprints. The color bar is often printed in the trim area of the web and may be utilized for registration as well as color monitoring purposes. Each solid patch has a target density that the color control system attempts to maintain. The inking level is increased or decreased to reach this target density. The halftone patches are also monitored (computing dot gain) to determine if the water balance is proper.

The newer short cutoff presses require the marks to be approximately 1.5 mm or less. A border of roughly 0.2 mm is required to accurately measure a color patch, leaving a width of only 1.1 mm or less to be used to calculate the reflectance or density value. Smaller color bars are more susceptible to the variation inherent to the printing process, and the validity of a reflectance or density reading on a narrow color bar is therefore questionable.

More importantly, however, is the fact that the color bars do not always indicate the colors of the work (the desired image to be printed). For example, a common practical problem encountered when running color on press is known as the "inline problem". This problem occurs when the inking requirements of two inline image portions (that is, two image portions in the same ink key zone) clash. For example, one image portion may consist of a red car, and the other may consist of a Caucasian face. In order to get the "cherry red" that the car requires, the magenta ink has to be run high. This unfortunately causes the face to appear too red. When a pressman runs into a situation such as this, the pressman attempts to find a magenta level that balances the facial tones against the red of the car.

Numerous systems have been developed for the control of color on a printing press that do not require the use of special test targets. For example, markless systems are described in U.S. Pat. Nos. 4,649,502, 4,660,159, 5,182,721, 5,224,421, 5,357,448, and 5,460,090.

On printing presses, there is a large variability in system gain from one job to the next. System gain refers to the amount of change in color due to a small change in ink feed amount. Control systems that can accurately predict the system gain and take into account the variability in system gain will converge faster than systems that have less accurate gain estimates.

Markless color control systems have been disclosed that describe empirical means for determining the system gain; for example, such systems are described in U.S. Pat. Nos. 4,660,159 and 5,182,721. Because the amount of coverage of a printing ink in a longitudinal strip has a large effect on the system gain for that ink, this must be repeated for each new job. This is a time-consuming process and one that produces additional waste products.

Alternatively, other systems disclose the use of a mathematical model to estimate the system gain. For example, U.S. Pat. Nos. 4,649,502 and 5,357,448 disclose the use of the Neugebauer equations, which relate dot area and reflectances of primaries to the reflectance of a halftone area. U.S. Pat. Nos. 4,649,502 and 4,660,159 make use of ink coverage in determining the system gain. U.S. Pat. No. 5,224,421 makes the assumption that the optical densities of inks are additive.

There are a number of aspects of the printing press that have been omitted from the models described in these patents. None of the models allow for a change in efficiency of inking with respect to coverage due to backflow of ink, lateral spread of ink due to the oscillatory vibrator rollers in the press, and the relationship between ink film thickness and reflectance. Exclusion of these factors from the model has an adverse effect on the accuracy of the determination of the system gain, and hence degrades system performance.

Markless systems are further limited in that no means are disclosed for precise alignment of the area of the printed material that is to be sampled. This is of most concern if measurements are to be made on a moving substrate, where timing and alignment of the sampling mechanism are difficult. Because of this, the sample points used by existing systems are forced to be larger than optimal, and preferably in an area of the work where the color is spatially constant.

A further aspect that is not considered by any of the markless color control systems disclosed in these patents is the visual effect of areas adjacent the sampling area on the appearance of a color within an image.

The systems described in U.S. Pat. Nos. 5,182,721, 5,224,421, and 5,357,448 require the collection of spectral data at a plurality of sampling points in the printed material. The use of spectral data is an additional expense and limits the practical number of sampling points that are available. U.S. Pat. No. 4,649,502 similarly has the additional expense of requiring an infrared channel.

SUMMARY OF THE INVENTION

It is an object of the present invention to provide a system and method for markless color control, that is, a system and method for accurate and efficient control of the ink control devices on a web-offset press that does not require the printing of special control marks or patches. It is a further object of the invention to provide a more accurate inking system model that accounts for various factors such as the effects of the roller train, the overall gain, and the relationship between optical density and ink film thickness on paper. Other factors that may be included in the inking system model are the back-flow of ink from the ink fountain roller to the ink reservoir, and the lateral movement of ink to adjacent ink key zones.

It is a further object of the invention to provide for comparison between very small areas acquired from the printed work and corresponding areas in the target image, by means of techniques for accurate alignment of the acquired image and the target image. It is a still further object of the invention to take into account the visual effect of areas adjacent the sampling area on the appearance of a color within an image. It is a still further object of the invention to accomplish markless color control of a plurality of inks (which may exceed three) with potentially as little as three spectral channels per spatial sampling area.

Recent computer-to-plate technology has enabled the digital representation of an image to be directly transferred to a printing plate via digital prepress data. Use of this digital prepress data will also permit plate coverage to be easily and more accurately obtained. Plate coverage is the ratio of the inked area on the printing plate to the total plate area, and provides a measure of the amount of ink required to print the desired image.

The invention relates to a markless system for controlling the ink feed that uses a video camera to obtain color values for a plurality of pixels of the image on the web. The acquired color values are aligned with and compared to target color values. A matrix equation relates ink key adjustments to changes in color values for the plurality of pixels. A press model provides the sensitivity factors linking the ink key adjustments to the changes in color values for each pixel. A least squares solution to the matrix equation is obtained to provide the ink key adjustments for each ink key zone. In this manner, it is possible to obtain color matching of the entire image, instead of just a few selected test points.

BRIEF DESCRIPTION OF THE DRAWINGS

FIG. 9 is a graph comparing apparent dot area to the dot area on the plate cylinder.

DESCRIPTION OF THE PREFERRED EMBODIMENT

Figure 1:
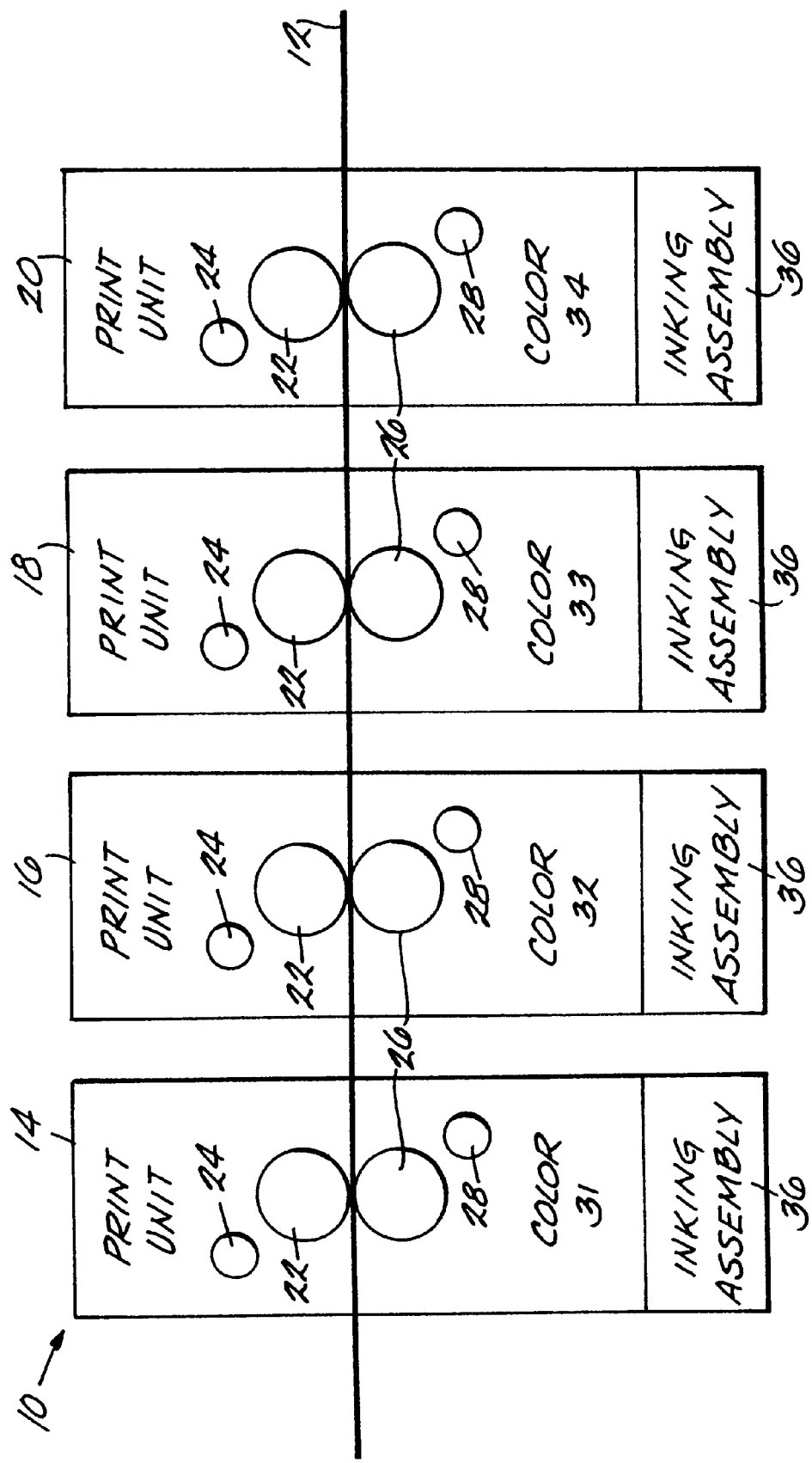
FIG. 1 is a block diagram of a web-offset printing system in accordance with the present invention.

Referring to FIG. 1, a web-offset printing system 10 for printing a multi-color image upon a web 12 is illustrated. In the preferred embodiment, four printing units 14, 16, 18, and 20 each print one color of the image upon the web 12. Each printing unit 14, 16, 18, 20 includes an upper blanket cylinder 22, an upper printing plate cylinder 24, a lower blanket cylinder 26, and a lower printing plate cylinder 28 to permit printing on both sides of web 12. In printing system 10, colors 31, 32, 33, and 34 on units 14, 16, 18, and 20 respectively, are typically black (K), cyan (C), magenta (M), and yellow (Y). The location of printing units 14, 16, 18, and 20 relative to each other is determined by the printer, and may vary.

Figure 2:
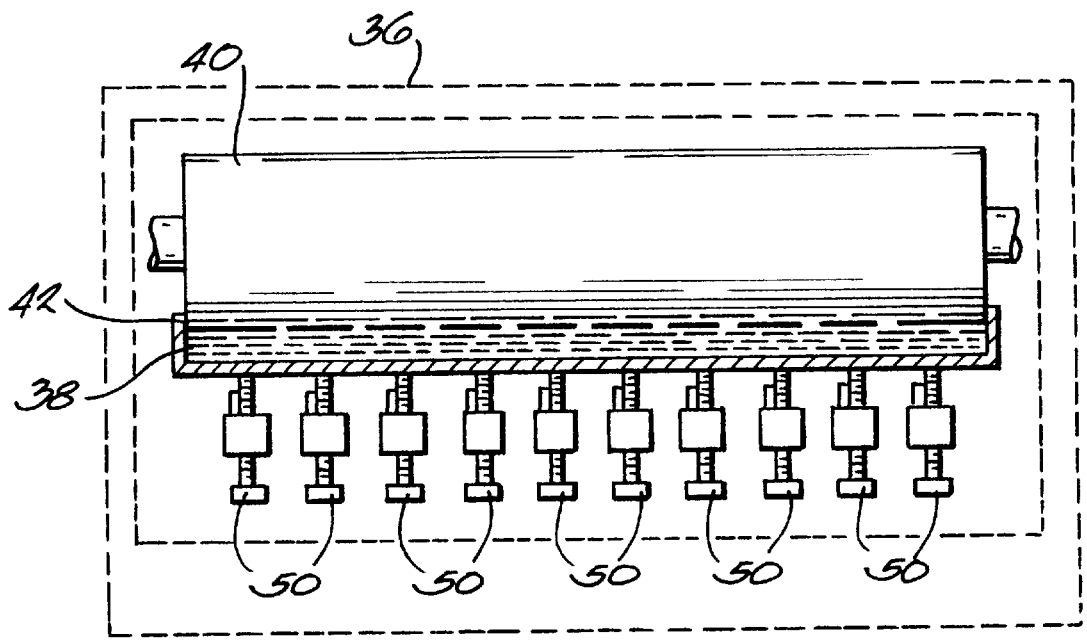
FIG. 2 is an illustration of an inking assembly including an ink fountain roller, ink reservoir, and ink keys.
Figure 8:
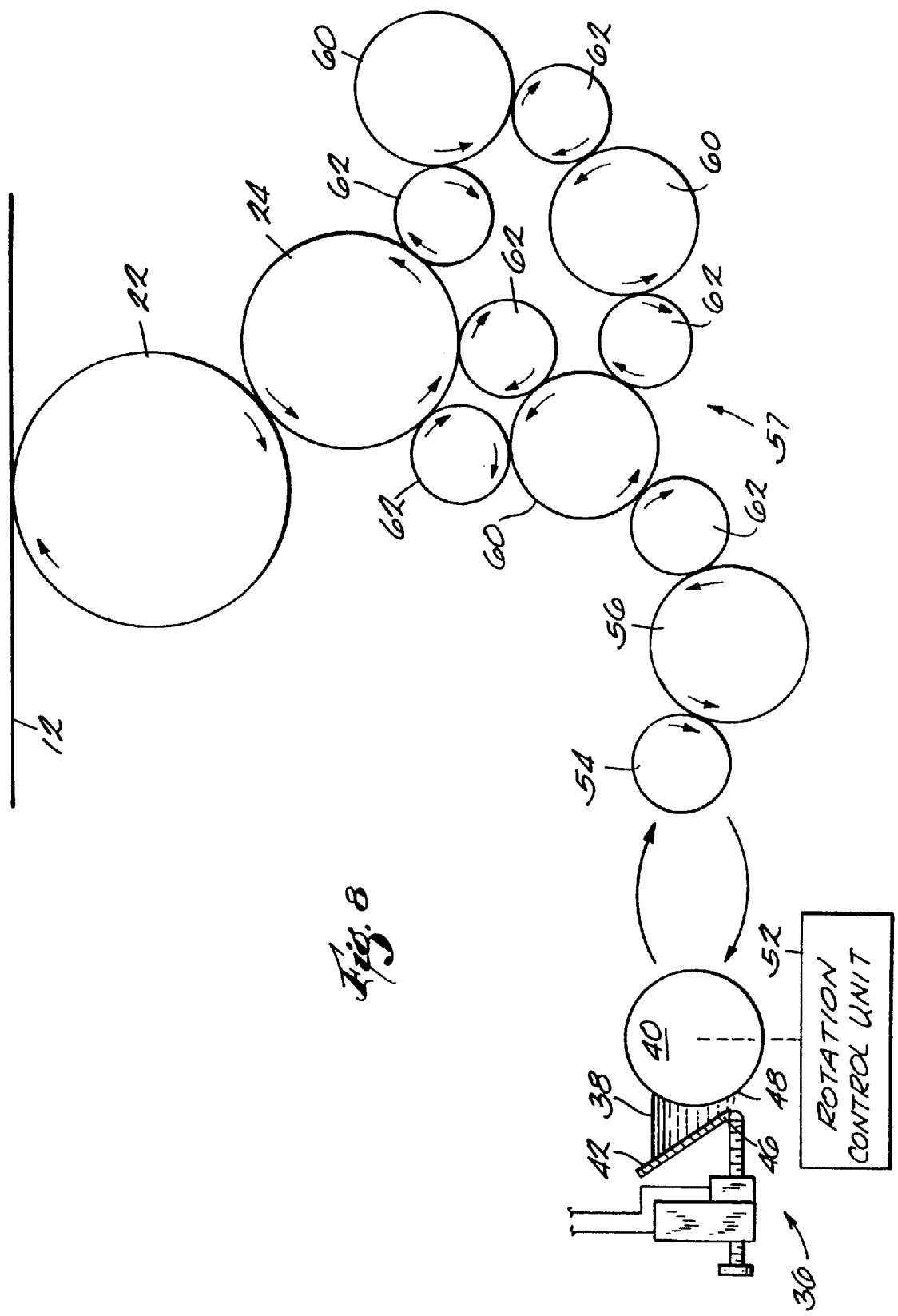
FIG. 8 is a schematic representation of ink flow from the inking assembly and to the web.

Each printing unit 14, 16, 18, and 20 includes an associated inking assembly 36 which is shown in FIGS. 2 and 8. Inking assembly 36 operates to supply ink to the web 12 in order to print images and includes an ink reservoir 38 disposed adjacent an ink fountain roller 40 (also known as the ink ball) which extends laterally across the web. A blade 42 extends along the ink fountain roller 40 and is segmented so that the spacing of each segment relative to the ink fountain roller 40 can be independently adjusted. As best seen in FIG. 8, each blade segment 44 has an edge 46 that is moved toward and away from the outer surface 48 of the ink fountain roller 40 by adjustment of an associated ink control device or ink key 50.

As shown in FIG. 2, a plurality of the ink keys 50 are disposed at equally-spaced lateral locations along the inking assembly 36 to press against the blade segments 44 at those locations to establish and adjust the size of the space between the roller 40 and the blade segment 44 to control the thickness of the ink film provided to the outer surface 48 of the ink fountain roller 40. The number of ink keys will vary with different types of printing presses. A common number of ink keys fora 36 inch wide web is 24, so each ink key controls ink to an ink key zone on the web that is about 1½ inches wide.

As illustrated in FIG. 8, the ink key 50 is driven by a bi-directional actuator motor 58 that operates to move the ink key 50 toward and away from the ink fountain roller 40 to position the associated blade segment as desired. A rotation control unit 52 operates via a ratchet assembly (not shown) to control the amount of rotation of the ink fountain roller 40 during each stroke, as is known in the art. The amount of rotation (rotation angle), along with the positions of the blade segments, determine the amount of ink transferred to a ductor roller 54. Ductor roller 54 continuously moves back and forth from contact with the ink fountain roller 40 and a roller 56 in the roller train 57. The ink film thickness supplied to the ductor roller 54 in the roller train is proportional to the product of the ink key opening and the ratchet setting.

Ink is supplied from the inking assembly 36 via the ink fountain roller 40 to the ductor roller 54 to roller 56 in the roller train 57. Ink is then supplied from roller 56 to the various other rollers 60, 62 in the roller train 57. Roller train 57 also includes several vibrator rollers 62. The vibrator rollers 62 oscillate in a lateral direction with respect to the web (where the direction of web movement is defined as the longitudinal direction) to ultimately spread ink from one ink key zone to another. The ink is then supplied to the printing plate cylinder 24, the blanket cylinder 22, and then to the web. FIG. 8 illustrates only the lower printing plate cylinder 24 and the lower blanket cylinder 22. It is to be understood that typically printing occurs on both sides of the web 12, and each side has an associated inking assembly 36 and roller train 57 for each of the ink colors.

Figure 3:
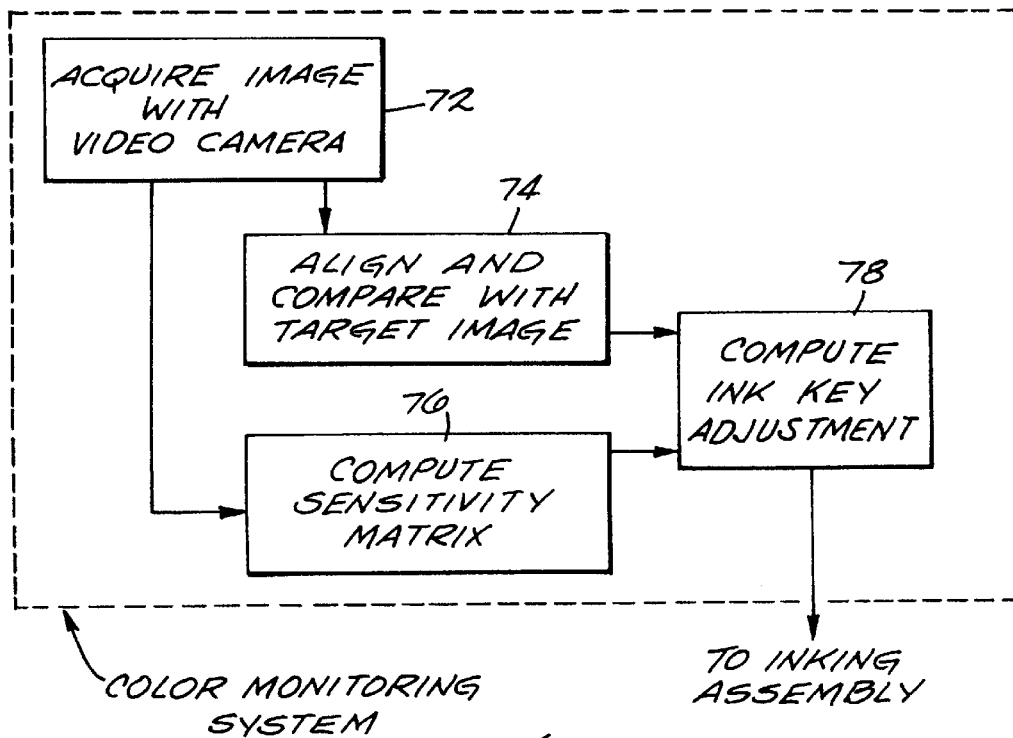
FIG. 3 is a schematic representation of the ink key control algorithm in accordance with the present invention.
Figure 4:
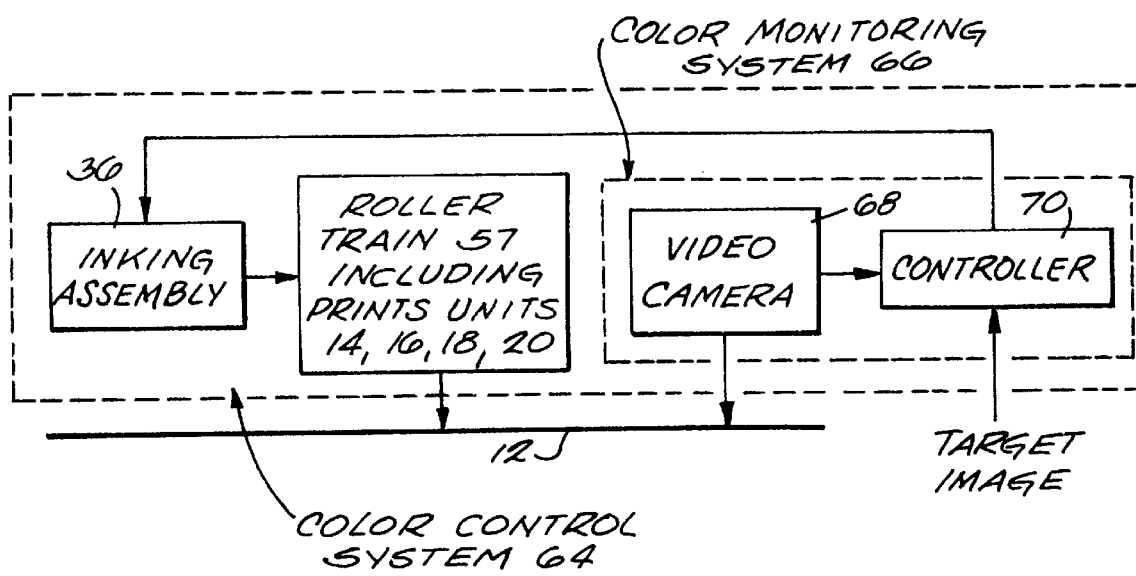
FIG. 4 is a block diagram of the color control system in accordance with the present invention.

With reference to FIGS. 3 and 4, the general operation of a control algorithm for a markless color control system can be described. The color control system 64 operates to determine the ink key settings to control the amount of ink fed to the printing units 14, 16, 18, 20 and to corresponding ink key zones on the web 12. The color control system 64 includes a color monitoring system 66 including a controller 70 and an imaging device such as video camera 68. In operation, in step 72, the video camera 68 acquires an image of the printed image on the web over multiple ink key zones. The controller 70 computes image values indicative of color such as reflectance, optical density values, CIELUV or CIELAB values for each image pixel within the camera's field of view. An acquired image array is produced. An array containing target image color values is obtained by one of the methods described below, and is stored in the controller 70. In step 74, the acquired image color array is first aligned with the target image color array. The acquired image color values are then compared with the target image color values, preferably on a pixel by pixel basis, to determine the desired changes in color values. A matrix equation, encompassing each of the plurality of pixels, is developed that relates the ink key adjustments to the measured changes in color values. In step 76, an inking system model provides the sensitivity factors linking ink key adjustments to the changes in color values. In step 78, a least squares solution to the matrix equation is obtained to produce a calculated set of ink key adjustments. The ink key adjustments are communicated to the inking assembly and the ink keys are then positioned based on the calculated ink key adjustments.

In particular, in the preferred embodiment, the color monitoring system 66 includes a color video camera 68 having red (R), green (G), and blue (B) color channels. The video camera 68 is used to acquire sequential images of the printed image on the web. A color monitoring system 66 including such a video camera and that accurately measures the reflectance and optical density of a plurality of printed color patches while the press is running is described in U.S. Pat. No. 5,724,259, issued Mar. 3, 1998. This patent is hereby incorporated by reference. Alternatively, the system may utilize an equivalent scanning device to measure reflectance from the printed substrate.

One difference between the preferred embodiment of the present invention and the system described in the above-referenced patent is the size of the camera's pixels. Most images in offset printing are printed with tiny halftone dots of various sizes rather than areas of solid color. The dots are close enough together so that under normal viewing conditions the dots are not visible and the illusion of color is made by the blurring together of various sizes of dots. The pixel size for the present invention needs to be large enough that the individual pixels blur the halftone dots. In the preferred embodiment, the video camera 68 produces an image having 640 by 480 pixels. With this number of pixels, moire patterns are largely eliminated with a field of view of approximately 25 cm by 25 cm. Thus, a reasonable size for the field of view is one full page, which requires a somewhat large camera assembly. In order to obtain undistorted images of a full page onto a standard video camera, the working distance is required to be at least 30 cm, although goniophotometric concerns suggest a working distance much larger than this.

Alternatively, the equivalent image can be collected by means of a linear CCD array with red, green, and blue filters. Scanning is accomplished as the web moves past the linear CCD array.

An additional difference between the preferred embodiment of the present invention and the system described in the above-referenced patent is that of color space. In the above-referenced patent, the preferred output color space is Status T optical density, whereas in the present invention, the preferred color space is a color space that is visually uniform. Examples of approximately uniform color spaces are CIELAB and CIELUV. Various means to convert RGB reflectances to XYZ color space and hence to CIELAB and CIELUV are treated in Seymour, J., *Why Do Color Transforms Work?*, Proceedings of the SPIE, Vol. 3018, pps. 156–164, 1997.

For each pixel, the color monitoring system 66 produces a set of RGB values, i.e., a set of three numbers, each of which is between 0 and 255 and represents reflected light in either the red, green, or blue channel. Also associated with each pixel is x and y position information. The color monitoring system 66 performs a number of corrections on the acquired set of RGB values, which may include corrections for vignetting, uneven illumination, scattered light, nonlinearity, and spectral characteristics, as described in the above-referenced patent. However, the color monitoring system 66 of the present invention does not perform color bar location and pixel averaging. In the preferred embodiment, the color values obtained are that of reflectance, optical density, or CIELAB. The acquired color values are obtained for each pixel, and an acquired image array is produced.

Target image color values can be obtained in several ways. One way requires the use of a prepress version of the image which is to be printed on the web. For example, the printing plates are scanned, preferably before they are mounted on the press. Scanning the plates yields inking level information for each pixel of the image, for each ink color.

Alternatively, digital prepress data can be used to obtain the necessary inking level information for each pixel. Digital prepress data is available from a system such as a CREO digital computer-to-plate system in the conventional form of Tagged-Image-File-Format (TIFF) which represents the plate in a 300 dot-per-inch format. By calculating dot gain and applying some approximations to the combining of inks via the Neugebauer equations, as further described below, an approximation is obtained for the R, G, and B target color values for each pixel.

Another way to obtain the target image color values is to scan a color proof. A color proof of the desired image to be printed is almost always available and is advantageous because the proof is presumably closer to the image that the customer desires, possibly closer even than the press is capable of providing. Unfortunately, the proof often only includes continuous tone information and may not include line art or text.

It is also possible to obtain the target image color values by directly using the video camera to obtain data directly from the on-press image once a color OK has been issued. A color OK indicates that the printed image on the web has been deemed acceptable. Using the on-press image itself to obtain the target image data is easier than using the prepress data, because the on-press image provides reflectance values directly and does not require the additional calculations involving dot gain and the Neugebauer equations. Also, it is unnecessary to correct for magnification and rotation translations (described below) because the target image data is obtained by the video camera under conditions similar to those under which the acquired image data is obtained.

In order to carry out a comparison between the acquired image color values and the stored target image color values, it is necessary for the acquired image to be correctly aligned with the target image. For example, for a given image, the color of the lower left corner of the car bumper must be compared with the color of the lower left corner of the car bumper, and not with the color of another part of the image such as a nose on a face.

There are three types of misalignment of one image with respect to another that may need to be corrected for: rotation, magnification, and translation. Of course, mechanical steps should be taken to assure that the prepress images and acquired images match as close as possible. However, the agreement will probably not be close enough so that corresponding pixels will be aligned. For example, a difference in magnification of as small as 0.2%, or a rotation as small as 0.1 degrees are large enough to cause a full pixel of misalignment.

A correction for the rotation of the acquired image with respect to the target image compensates for the camera not being mounted perfectly square to the image printed on the web. A correction for the differences in magnification between the two images compensates for the elongation or compression of the image in the X and/or Y direction. A correction for translational misalignment compensates for the lateral or longitudinal position of the camera being displaced with respect to the printed image or for mistiming of the image collection signal.

In the preferred embodiment, the target image and an acquired image are broken up into a number of smaller images, such as 9 or 16 sub-images. A cross correlation is computed between corresponding sub-images in order to determine the optimal translation to align the two sub-images. The process of cross correlation is described in more detail in U.S. Pat. No. 5,412,277. Note that the cross correlation here does not need to be as computationally intensive as is a cross correlation performed for registration purposes. Cross correlation is only necessary in a single channel, assuming that the R, G and B channels of the video camera are in alignment. Also, the images for the cross-correlation can be decimated by a factor of perhaps two or four in each direction.

The result of each cross-correlation for each sub-image pair is two pairs of coordinates: $(x_i, y_i)$, which is in the center of sub-image i of the target image, and $(x_i', y_i')$, which is the corresponding point in the acquired image.

Figure 5:
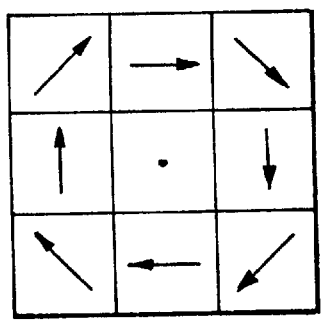
FIG. 5 illustrates the offsets of one image rotated about the center from another.

FIG. 5 schematically illustrates the patterns of calculated X and Y offsets of one image that is rotated about the center from the other. The centermost sub-image would require very little X and Y offset to get the respective sub-images to match. The direction of the offset required to match a pair of sub-images depends upon which direction the pair of sub-images is from the center of rotation. The offset directions are always at right angles to a line drawn toward the center of rotation.

Figure 6:
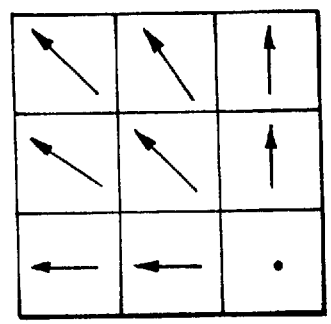
FIG. 6 illustrates the offsets if one image were to be changed in magnification from another.

FIG. 6 illustrates the patterns of offsets if one image were to be changed in magnification from the other, with the center of magnification in the lower right-hand corner. The directions of the offsets are always directly away from the center of magnification, and the magnitude of the offsets is proportional to the distance from the center of magnification.

As a result, there are two sets of equations which are used to find the constants for the geometric transformation. One set of equations for x is as follows:

$$x_1' = (m_x\cos\theta)x_1 + (m_y\sin\theta)y_1 + x_s \qquad (E2)$$

$$x_2' = (m_x\cos\theta)x_2 + (m_y\sin\theta)y_2 + x_s$$

$$\vdots$$

$$x_n' = (m_x\cos\theta)x_n + (m_y\sin\theta)y_n + x_s$$

Similarly, one set of equations for y is as follows:

$$y_1' = (-m_x\sin\theta)x_1 + (m_y\cos\theta)y_1 + y_s \qquad (E3)$$

$$y_2' = (-m_x\sin\theta)x_2 + (m_y\cos\theta)y_2 + y_s$$

$$\vdots$$

$$y_n' = (-m_x\sin\theta)x_n + (m_y\cos\theta)y_n + y_s$$

where:

$m_x$ is the magnitude in the x direction, $m_y$ is the magnitude in the y direction, $\theta$ is the rotation angle, $x_s$ is the x offset, and $y_s$ is the y offset.

These can be written in matrix form:

$$\begin{bmatrix} x_1' \\ x_2' \\ \vdots \\ x_n' \end{bmatrix} = \begin{bmatrix} x_1 & y_1 & 1 \\ x_2 & y_2 & 1 \\ \vdots & \vdots & \vdots \\ x_n & y_n & 1 \end{bmatrix} \begin{bmatrix} m_x\cos\theta \\ m_y\sin\theta \\ x_s \end{bmatrix} \qquad (E4)$$

and:

-continued $$\begin{bmatrix} y'_1 \\ y'_2 \\ \vdots \\ y'_n \end{bmatrix} = \begin{bmatrix} x_1 & y_1 & 1 \\ x_2 & y_2 & 1 \\ \vdots & \vdots & \vdots \\ x_n & y_n & 1 \end{bmatrix} \begin{bmatrix} -m_x\sin\theta \\ m_y\cos\theta \\ y_s \end{bmatrix} \quad (E5)$$

These equations have a least squares solution as follows:

$$\begin{bmatrix} m_x\cos\theta \\ m_y\sin\theta \\ x_s \end{bmatrix} = \left( \begin{bmatrix} x_1 & y_1 & 1 \\ x_2 & y_2 & 1 \\ \vdots & \vdots & \vdots \\ x_n & y_n & 1 \end{bmatrix}^T \begin{bmatrix} x_1 & y_1 & 1 \\ x_2 & y_2 & 1 \\ \vdots & \vdots & \vdots \\ x_n & y_n & 1 \end{bmatrix} \right)^{-1} \begin{bmatrix} x_1 & y_1 & 1 \\ x_2 & y_2 & 1 \\ \vdots & \vdots & \vdots \\ x_n & y_n & 1 \end{bmatrix}^T \begin{bmatrix} x'_1 \\ x'_2 \\ \vdots \\ x'_n \end{bmatrix} \quad (E6)$$

$$\begin{bmatrix} -m_x\sin\theta \\ m_y\cos\theta \\ y_s \end{bmatrix} = \left( \begin{bmatrix} x_1 & y_1 & 1 \\ x_2 & y_2 & 1 \\ \vdots & \vdots & \vdots \\ x_n & y_n & 1 \end{bmatrix}^T \begin{bmatrix} x_1 & y_1 & 1 \\ x_2 & y_2 & 1 \\ \vdots & \vdots & \vdots \\ x_n & y_n & 1 \end{bmatrix} \right)^{-1} \begin{bmatrix} x_1 & y_1 & 1 \\ x_2 & y_2 & 1 \\ \vdots & \vdots & \vdots \\ x_n & y_n & 1 \end{bmatrix}^T \begin{bmatrix} y'_1 \\ y'_2 \\ \vdots \\ y'_n \end{bmatrix} \quad (E7)$$

These equations provide values for $m_x\cos\theta$, $m_y\sin\theta$, $x_s$, and $y_s$. Note that it is not necessary for $m_x$, $m_y$, and $\theta$ to be individually determined.

The position information for each pixel is corrected for magnification, translation and rotation effects due to the position and effects of the camera, the position of the image on the web, and the strobe timing. For example, if an acquired image color value is associated with a point in the printed image having coordinates (x, y), then the color value would be moved to be associated with new coordinates ($m_x x$, $m_y y$) to effect a correction for magnificational misalignment. Similarly, if a color value is associated with a point in the image having coordinates (x, y), then the new coordinates of that point would be given by ($x\cos\theta+y\sin\theta$, $-x\sin\theta+y\cos\theta$) in order to effect a correction for a rotational misalignment, where $\theta$ is the amount of rotation. Finally, if a color value is associated with a point in the image having coordinates (x, y), then the new coordinates of that point are given by ($x+x_s$, $y+y_s$) in order to effect a correction for translational misalignment. Putting the above corrections together, the following equations are obtained and are used to determine the new coordinates (x', y') to be associated with each acquired image color value:

$$x'=(m_x \cos\theta)x+(m_y \sin\theta)y+x_s$$

$$y'=(-m_x \sin\theta)x+(m_y \cos\theta)y+y_s \quad (E8)$$

Pixels with no overlap between the two images are discarded, and the color values are interpolated if necessary so that it is possible to compare the values on a pixel by pixel basis.

It is likely that the rotation and magnification parameters will not change frequently. Thus, it may be possible to calibrate $m_x$, $m_y$ and $\theta$ by the aforementioned process only as needed.

If imaging is performed on a moving press, it is likely that the offset parameters $x_s$ and $y_s$ will need to be updated for each acquired image. Techniques for performing this are well known in the art, such as cross-correlation (see for example U.S. Pat. No. 5,412,577) and phase correlation (see for example U.S. Pat. No. 5,689,425).

Next, the acquired image color values and the stored target image color values are compared on a pixel by pixel basis. The results of the pixel by pixel comparison provide the desired changes in the color values for all the remaining pixels. This is done for each of the three color channels.

The following section develops the equations that relate the desired changes in the color values (preferably CIELAB values) for a particular color channel of the video camera to the changes in the ink key settings. In this manner, a sensitivity matrix can be determined.

The following equation relates the desired change in the color value in the CIELAB L* value to the changes in the ink key settings for a single pixel:

$$S_{cL}\cdot C_\Delta + S_{mL}\cdot M_\Delta + S_{yL}\cdot Y_\Delta + S_{kL}\cdot K_\Delta = L^*_\Delta \quad (E9)$$

where:

$L^*_\Delta$ is the measured change in CIELAB L* values, $C_\Delta$, $M_\Delta$, $Y_\Delta$, $K_\Delta$ are the changes in cyan, magenta, yellow and black ink levels, respectively, and $S_{cL^*}$, $S_{mL^*}$, $S_{yL^*}$, $S_{kL^*}$ are the sensitivity factors of the system (including press gain, coverage, ink characteristics, etc.), or in other words, the sensitivity of the L* value to the changes in respective ink levels C, M, Y, and K.

The sensitivity factor $S_{xy}$ is thus the amount of change in CIELAB value "y" to a one unit change in ink level "x". The sensitivity factors are not fixed constants, but are values that depend on press conditions.

For example, the sensitivity factors vary with ink film thickness. When the ink layer is thin, the change in L* values per unit change in ink thickness is larger than when the ink layer is thick.

The sensitivity factors also depend on the dot area on the plate for any particular combination of pixel and ink. For example, if the plate does not call for any magenta ink at the location corresponding to the particular pixel, then all the sensitivity factors for magenta will be zero. The magnitude of the sensitivity factors will increase as the dot area on the plate increases.

Similar formulas can be derived for the change in the a* and b* values for a single pixel:

$$S_{ca}\cdot C_\Delta + S_{ma}\cdot M_\Delta + S_{ya}\cdot Y_\Delta + S_{ka}\cdot K_\Delta = a^*_\Delta$$

$$S_{cb}\cdot C_\Delta + S_{mb}\cdot M_\Delta + S_{yb}\cdot Y_\Delta + S_{kb}\cdot K_\Delta = b^*_\Delta \quad (E10)$$

These three equations for $L^*_\Delta$, $a^*_\Delta$, and $b^*_\Delta$ can be combined into a single, under-determined matrix equation, as follows:

$$\begin{bmatrix} S_{cL^*} & S_{mL^*} & S_{yL^*} & S_{kL^*} \\ S_{ca^*} & S_{ma^*} & S_{ya^*} & S_{ka^*} \\ S_{cb^*} & S_{mb^*} & S_{yb^*} & S_{kb^*} \end{bmatrix} \begin{bmatrix} C_\Delta \\ M_\Delta \\ Y_\Delta \\ K_\Delta \end{bmatrix} = \begin{bmatrix} L^*_\Delta \\ a^*_\Delta \\ b^*_\Delta \end{bmatrix} \quad (E11)$$

This matrix equation cannot be directly solved for the ink key change vector, because there are an infinite combination of ink key change vectors which will solve the equation.

Adding data from another pixel into the system of equations results in six equations in four unknowns, as follows:

$$\begin{bmatrix} S_{cL1*} & S_{mL1*} & S_{yL1*} & S_{kL1*} \\ S_{ca1*} & S_{ma1*} & S_{ya1*} & S_{ka1*} \\ S_{cb1*} & S_{mb1*} & S_{yb1*} & S_{kb1*} \\ S_{cL2*} & S_{mL2*} & S_{yL2*} & S_{kL2*} \\ S_{ca2*} & S_{ma2*} & S_{ya2*} & S_{ka2*} \\ S_{cb2*} & S_{mb2*} & S_{yb2*} & S_{kb2*} \end{bmatrix} \begin{bmatrix} C_\Delta \\ M_\Delta \\ Y_\Delta \\ K_\Delta \end{bmatrix} = \begin{bmatrix} L1^*_\Delta \\ a1^*_\Delta \\ b1^*_\Delta \\ L2^*_\Delta \\ a2^*_\Delta \\ b2^*_\Delta \end{bmatrix} \quad (E12)$$

The numbers in the subscripts refer to the number of the pixel where the data is obtained.

The extension to an arbitrary number, n, of pixels provides a linear equation of 3n equations in 4 unknowns, as follows:

$$\begin{bmatrix} S_{cL1*} & S_{mL1*} & S_{yL1*} & S_{kL1*} \\ S_{ca1*} & S_{ma1*} & S_{ya1*} & S_{ka1*} \\ S_{cb1*} & S_{mb1*} & S_{yb1*} & S_{kb1*} \\ S_{cL2*} & S_{mL2*} & S_{yL2*} & S_{kL2*} \\ S_{ca2*} & S_{ma2*} & S_{ya2*} & S_{ka2*} \\ S_{cb2*} & S_{mb2*} & S_{yb2*} & S_{kb2*} \\ \vdots & \vdots & \vdots & \vdots \\ S_{cLn*} & S_{mLn*} & S_{yLn*} & S_{kLn*} \\ S_{can*} & S_{man*} & S_{yan*} & S_{kan*} \\ S_{cbn*} & S_{mbn*} & S_{ybn*} & S_{kbn*} \end{bmatrix} \begin{bmatrix} C_\Delta \\ M_\Delta \\ Y_\Delta \\ K_\Delta \end{bmatrix} = \begin{bmatrix} L1^*_\Delta \\ a1^*_\Delta \\ b1^*_\Delta \\ L2^*_\Delta \\ a2^*_\Delta \\ b2^*_\Delta \\ \vdots \\ Ln^*_\Delta \\ an^*_\Delta \\ bn^*_\Delta \end{bmatrix} \quad (E13)$$

Pixels from a camera are generally laid out in a two dimensional grid, so the numbering of the pixels is arbitrary: it can be either column-major or row-major order. There are three equations for each of the n pixels in the image. The value of n is about a quarter of a million for an image with a size of 640×480 pixels. Since there are three color measurements for each pixel, equation (E13) is a system of ¾ million equations and 4 unknowns.

For simplicity, let S be the 3n by 4 matrix of sensitivity factors, $N_\Delta$ be the 4 point vector of ink key changes, and Z be the 3n point vector of desired color value changes. This results in the following linear equation:

$$S\, N_\Delta = Z \quad (E14)$$

The above equation is overdetermined because there are more constraints than there are variables and there are not enough "degrees of freedom" to expect to exactly solve all the equations. The least squares solution to the above equation, a standard result from linear algebra, is:

$$N_\Delta = (S^T S)^{-1} S^T Z \quad (E15)$$

where:

$S^T$ is the transpose of S.

The elements of $N_\Delta$ constitute the calculated set of ink key adjustments. The ink keys are proportionally adjusted based on the calculated ink key adjustments in each ink key zone.

By taking into account the effect of almost every individual color pixel in the image rather than merely twenty or fewer test points, this method partially accounts for how the color of a pixel is affected by the color of all the neighboring pixels. This is called the effect of simultaneous contrast or color appearance matching.

In order to compute the sensitivity factors in the above equation, a model-based equation is developed that approximates a color characteristic (such as L*, a* and b*) at a point on the web, given various press conditions, including the ink key settings. The model-based equation is then differentiated with respect to the ink key settings to obtain the sensitivity factors.

Figure 7:
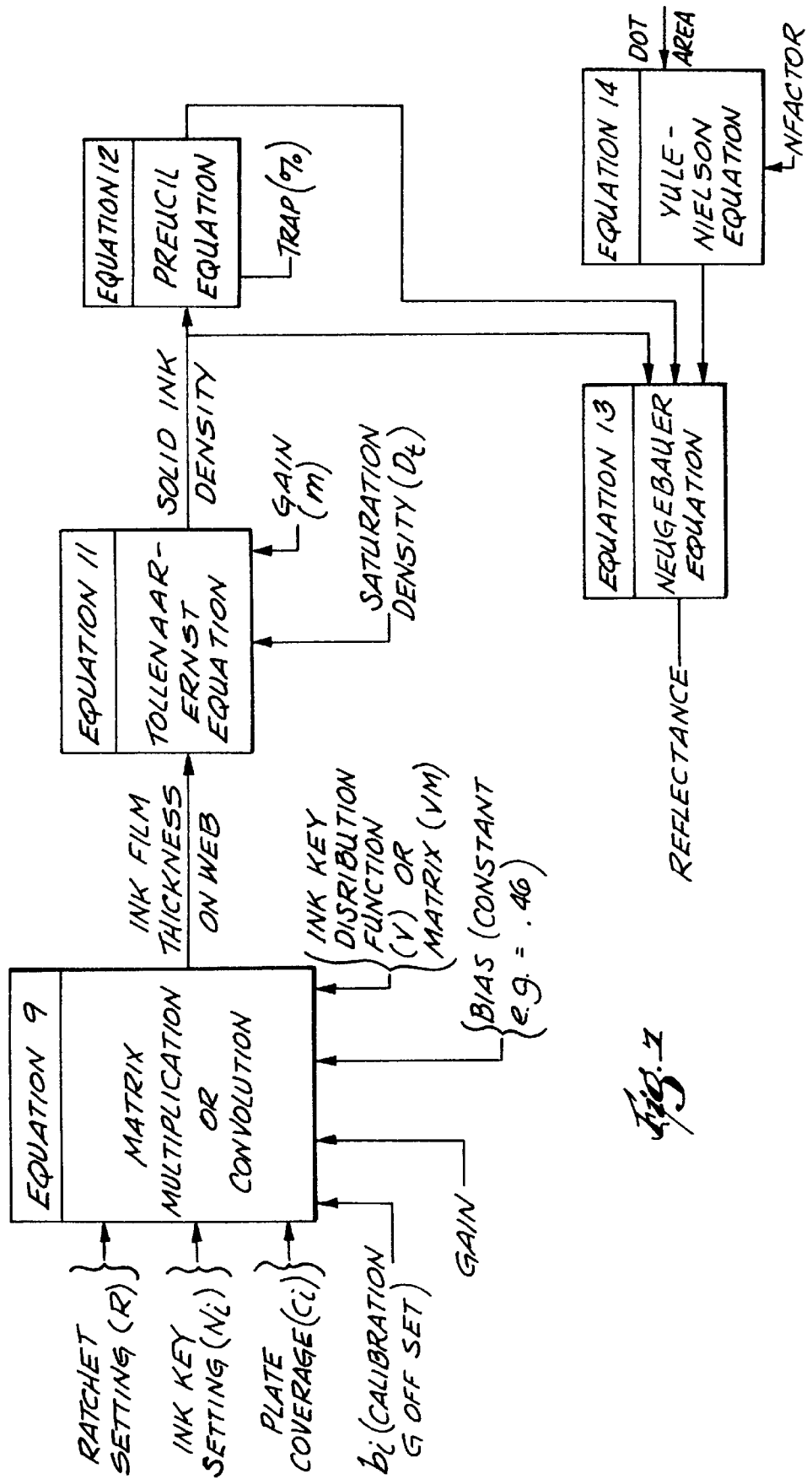
FIG. 7 illustrates a schematic of the inking system model.

The complete model-based equation is arrived at by linking together several equations comprising portions of an inking system model. One inking system model is described in U.S. patent application Ser. No. 08/997,228, filed Dec. 23, 1997 and titled "INK KEY CONTROL IN A PRINTING PRESS INCLUDING LATERAL INK SPREAD, INK SATURATION, AND BACK-FLOW COMPENSATION". This patent application is hereby incorporated by reference. A schematic of the inking system model is shown in FIG. 7. In the diagram, variables associated with horizontal arrows indicate variables that change with the different jobs to be run. The variables associated with arrows pointing up indicate parameters that are assumed constant throughout a job, and possibly from job to job. The relevant equations are repeated below.

One aspect of the color control system that is included in the model is the relationship between the actual ink key opening and the displayed ink key value. As previously described, signals from the controller are sent to corresponding motors that move the associated ink keys. The relationship between the actual ink key openings, for example, as measured with a feeler gauge, and the displayed ink key values can be modeled with a linear gain and a calibration offset. The relationship between ink key openings and displayed ink key values is as follows:

$$P = a(N - b) \quad (E16)$$

where:

P is the ink key opening in mils,

N is the displayed ink key setting in percent, a is a measurable constant, and b is the displayed value when the ink key opening is just closed.

Another aspect included in the inking system model is the relationship between the ink film thickness on the ink fountain roller and the ink key opening. The relationship between ink film thickness on the ink fountain roller and the ink key opening is as follows:

$$T_b = z\, P \quad (E17)$$

where:

$T_b$ is the ink film thickness on the ink fountain roller, z is a constant, which is dependent on the ink, and P is the ink key opening as defined directly above.

The assumption is made that the relationship between the ink film thickness on the ink fountain roller and the ink film thickness on the ductor roller is also linear. The rotation control unit sets the ratchet setting to linearly control the angle that the ink fountain roller rotates during each stroke. The rotation angle, along with the positions of the blade segments, determine the amount of ink transferred to the ductor roller. The relationship between rotation angle and the amount of ink transferred to the ductor roller is also assumed to be linear. Thus, the ink film thickness supplied to the ductor roller in the roller train is proportional to the product of the ink key opening and the ratchet setting. This relationship can be represented by:

$$T = g\, T_b\, R \quad (E18)$$

where:

T is the ink film thickness on the ductor roller, g is a constant related to the efficiency of ink transfer, $T_b$ is the ink film thickness on the ink fountain roller, and R is the ratchet setting (in relative amount from 0 to 1).

The lateral movement of the vibrator rollers on the ink flow can also be taken into account. The effect of the vibrator rollers on ink flow is modeled using an ink key distribution function that is convolved with the ink key openings. A convolution model is one in which it is assumed that opening a given ink key will result in a fixed percentage of ink being transferred to certain of the neighboring ink key zones. The convolution model further assumes that the percentage of ink deposited on a particular zone is independent of the magnitude of the ink key opening as well as independent of plate coverage and also independent of the opening of neighboring ink keys.

One form of the ink key distribution function is a vector V. The elements of vector V can be interpreted as the fraction of ink which is distributed to a specific neighboring ink key zone. Each ink key results in its own distribution of ink, which is proportional to the ink key opening. For a Harris M1000B press, for example, 46% of the ink provided by a given ink key is passed directly into its corresponding ink key zone, 20% is passed to the immediate neighboring zones, and 4% is passed to the next set of neighbors, and so on. Thus, for the Harris M1000B press, this vector V can be represented by the following:

$$V=[0.007\ 0.009\ 0.016\ 0.043\ 0.196\ 0.460\ 0.196\ 0.043\ 0.016\ 0.009\ 0.007]$$

Of course, the exact values for a given press depend upon the lateral throw of the vibrator rollers and the layout of the ink train.

A vector equation relating the ink film thickness on the ductor roller to the ink film thickness presented to the plate cylinder is as follows:

$$L_i = V \cdot TD \qquad (E19)$$

where:
- $L_i$ is the ink film thickness on an imaged area of the printing plate on the plate cylinder at the $i^{th}$ ink key zone,
- V is the vector representing ink key distribution function, and
- TD is the following vector:

$$[T_{i-5}\ T_{i-4}\ T_{i-3}\ T_{i-2}\ T_{i-1}\ T_i\ T_{i+1}\ T_{i+2}\ T_{i+3}\ T_{i+4}\ T_{i+5}]^T$$

where:
- $T_i$ is the ink film thickness on the ductor roller at the $i^{th}$ ink key zone.

The above equation can be rewritten in terms of a matrix multiplication:

$$L = VM\ T \qquad (E20)$$

where:
- L is a 24 by 1 element matrix wherein the elements are values representative of the ink film thickness presented to the printing plate in each of the ink key zones, and
- T is a 24 by 1 element matrix containing values representative of the ink film thickness on the ductor rollers. (The size is determined by the fact that there are 24 ink keys on the Harris M1000B press.)

A 24 by 24 element matrix, VM, is formed as the vibrator matrix, where $VM_{ij}$ represents the portion of ink from ink key j that reaches the plate in ink key zone i. If the ink spread is invariant across the ink keys, then matrix VM is a Toeplitz matrix, that is, a matrix in which each row is a shifted version of the row above. Each row contains the elements of the vector V.

Alternatively, the matrix may not be Toeplitz. A more accurate model of the press would take into account the fact that in ink key zones of lower coverage, the ink will spend more time in the ink train, and hence will spread more. The rows of matrix VM will change to account for this. In addition, a similar effect occurs at the edges of the web, so that the spread is greater at the edges.

Another aspect of the model is the relationship between the ink required at the ductor roller and the plate coverage (without considering the effect of the vibrator rollers). A model-based plate coverage equation is as follows:

$$E = 0.54 C_i + 0.46 \qquad (E21)$$

where:
- E is the relative ink utilization factor, and
- $C_i$ is the plate coverage for the ith ink key zone (a decimal amount from zero to 1).

The precise constants in Equation (E21) depend upon the layout of the ink train.

This equation indicates that an ink feed of 46% of that required for full coverage is needed even for minimal plate coverage. This is the bias amount shown in FIG. 7. This contradicts the conventional paradigm that no ink is needed if there is minimal coverage. According to the conventional paradigm, the ink key should not be opened if the plate coverage is very nearly zero. However, the conventional paradigm is not accurate because it ignores the fact that the ink is not only being transferred forward to the web, but that part of the ink is also transferred back to the ink reservoir.

The relationship between the ink film thickness at the plate cylinder and the ink film thickness on the web can be represented by the following vector equation:

$$F_i = \frac{L_i}{.54 C_i + .46} \qquad (E22)$$

where:
- $F_i$ is the ink film thickness on the web in the $i^{th}$ ink key zone,
- $L_i$ is the ink film thickness on an imaged area of the printing plate on the plate cylinder 122 at the $i^{th}$ ink key zone, and
- $C_i$ is the plate coverage for the $i^{th}$ ink key zone.

The ink film thickness on the web in the $i^{th}$ ink key zone can be rewritten as the following equation:

$$F_i = \frac{GRV(K_i - b_i)}{(.54 C_i + .46)} \qquad (E23)$$

where:
- $F_i$ is the ink film thickness on the web at the $i^{th}$ ink key zone, (i is the zonal index, from 1 to 24),
- G is the overall system gain (which takes into account constants a, z, and g),
- R is the ratchet setting,
- $C_i$ is the plate coverage in the $i^{th}$ ink key zone,
- V is the vector representing ink key distribution function, and
- $(K_i - b_i)$ is a vector representing zonal key opening minus its calibration offset, at ink key zones centered about the $i^{th}$ ink key zone.

For the Harris M1000B press, the following equation is obtained:

$$F_i = \frac{GR}{(.54C_i + .46)} \begin{bmatrix} .007 \\ .009 \\ .016 \\ .043 \\ .196 \\ .460 \\ .196 \\ .043 \\ .016 \\ .009 \\ .007 \end{bmatrix}^T \begin{bmatrix} K_{i-5} - b_{i-5} \\ K_{i-4} - b_{i-4} \\ K_{i-3} - b_{i-3} \\ K_{i-2} - b_{i-2} \\ K_{i-1} - b_{i-1} \\ K_i - b_i \\ K_{i+1} - b_{i+1} \\ K_{i+2} - b_{i+2} \\ K_{i+3} - b_{i+3} \\ K_{i+4} - b_{i+4} \\ K_{i+5} - b_{i+5} \end{bmatrix} \quad (E24)$$

Fortunately, G can be readily attained by empirical measurements. To obtain G, measurements are taken of images on the web at a particular vector of known ink key settings K. Density measurements of the image are taken, and the vector, T, of ink film thicknesses on the ductor roller is calculated by means described below.

An equation relating ink film thickness and ink density is known as the Tollenaar-Ernst equation:

$$D = D_t(1 - e^{-mF}) \quad (E25)$$

where:

D is the solid ink density, $D_t$ is the saturation density, i.e., the density of an infinitely thick ink film, m is a constant, and F is the ink film thickness on the web.

The saturation density, $D_t$, depends most strongly upon the smoothness of the substrate. Ink on uncoated paper will have a much lower saturation density than ink on coated paper. Another factor that affects the saturation density is the particular ink used. For example, yellow ink has a lower saturation density than black ink. The constant m is the ink strength parameter, which depends largely upon the tinctorial strength of the ink, that is, the amount of pigment. In order to determine constants m and $D_t$, an experiment can be performed wherein the ratchet assembly is set to various percentages, e.g. 10%, 20%, 30%, . . . , 90%, a solid image is printed and its optical density measured.

Another equation relates the solid ink density for individual inks with the density of the overprint of those inks. The Preucil apparent trap formula assumes that Beer's law applies (that is, the densities of the two inks will add), and that any deviation from this is solely due to a thinner second layer of ink. The assumption is that ink will not stick as well to ink as to paper. This is called physical or apparent trap.

$$\text{APPARENT TRAP} = \frac{D_{OP} - D_1}{D_2} \quad (E26)$$

where:

$D_{OP}$ is the density of the overprint, $D_1$ is the density of the first printed ink, and $D_2$ is the density of the second printed ink.

Normally apparent trap is used as a press diagnostic. It is measured on press to help determine where a problem might be. For example, if the apparent trap is out of the normal range, then the assumption is that the tack of the inks is not correct, or there is an ink-water balance problem. For the present purposes, the equation will be used in the opposite direction. A typical value for apparent trap would be assumed, and the above equation will be solved for the density of the overprint, given that the densities of the first and second printed inks are known.

There are two additional significant sources of deviation from Beer's law that the Preucil formula does not handle. The first is surface reflection. Surface reflection will impose an upper limit to densities, thus causing a saturation at higher densities. This will make both ink layers appear thinner.

The second source of deviation is scattering of light within the top layer of ink. This increases the opacity of the top layer so that the bottom layer appears thinner.

Another effect to take into account in the complete equation is the inclusion of dot area.

Neugebauer developed a set of equations to predict the reflectance of a halftone printed with a variety of inks, based on the percent of area coverage of each of the inks. The model is based on the concept of the Neugebauer primaries and on an assumption of random overlap.

The Neugebauer primaries are all the possible solid ink colors. For example, there are eight Neugebauer primaries with a three ink CMY printing process: white, cyan, magenta, yellow, blue (cyan+magenta), green (cyan+yellow), red (magenta+yellow) and black (cyan+magenta+yellow). There are sixteen primaries with a CMYK printing process. The halftone reflectance in a particular spectral band, $R_h$, for a three ink process can be written as follows:

$$R_h = (1 - A_c)(1 - A_m)(1 - A_y)R_w + A_c(1 - A_m)(1 - A_y)R_c + \quad (E27)$$
$$(1 - A_c)A_m(1 - A_y)R_m + (1 - A_c)(1 - A_m)A_yR_y +$$
$$A_cA_m(1 - A_y)R_b + A_c(1 - A_m)A_yR_g +$$
$$(1 - A_c)A_mA_yR_r + A_cA_mA_yR_r$$

where:

$A_c$, $A_m$, and $A_y$ are the fraction percentages of dot areas of cyan, magenta, and yellow ink, respectively, and $R_w$, $R_c$, $R_m$, $R_y$, $R_b$, $R_g$, $R_r$, and $R_k$ are the reflectance values of the Neugebauer primaries white, cyan, magenta, yellow, blue, green, red and black in the spectral band of $R_h$.

The extension to four or more inks is straight forward.

Note that the Neugebauer equations assume that the reflectance of the primaries are known, and a constant ink film thickness is assumed.

Additional improvements to the Neugebauer equations can be achieved by incorporating corrections for dot gain, or tone value increase. If one were to compare the dots on a plate to the dots on the printed web, it would be seen that the printed dots are larger. Basically, when the dots of ink are transferred from the plate to the blanket and from the blanket to the paper, the dots get smeared. A smeared dot provides more color than a non-smeared dot. This dot smearing is called physical dot gain.

There is a second phenomena involved in dot gain that is called optical dot gain. This is an increase in the saturation of the color, largely due to scattered light in the paper. In reality, this is more accurately termed a tone value increase, because the dots do not look larger, but the paper between the dots appears more colored.

The effect of dot gain is illustrated in FIG. 9, which compares apparent dot area to the dot area on the plate. The vertical line represents a dot area of 50% on the plate. Without dot gain, the ink coverage on the paper would be the same, and the apparent dot area would also be 50%. In this case, the Neugebauer equations would accurately predict the color. With dot gain, however, the apparent dot area for this same plate may be 67 to 75%, as shown on the upper curve.

Yule and Nielsen were the first to address this problem. They came up with the empirical solution which has become know as "the n factor". The apparent dot area, used in the above Neugebauer equations, is calculated by:

$$A_a = A^{1/n} \quad \text{(E28)}$$

where:

$A_a$ is the apparent dot area,

A is the actual dot area on the plate, and n is a constant that depends on screen ruling and paper, and is typically 1.6 to 2.2.

Finally, the red, green and blue reflectances as computed by the Neugebauer equations are converted into XYZ values in accordance with one of the methods described in Seymour, J., *Why Do Color Transforms Work?*, Proceedings of the SPIE, Vol. 3018, pps. 156–164, 1997. In the preferred embodiment, a 9×3 matrix transform is used:

$$\begin{bmatrix} X \\ Y \\ Z \end{bmatrix} = \begin{bmatrix} .868 & .046 & .115 & .042 & .074 & .084 & -.136 & .018 & -.037 \\ .425 & .527 & -.012 & -.059 & -.031 & .031 & .174 & -.014 & -.038 \\ -.017 & .064 & .976 & .031 & -.003 & .000 & -.039 & -.054 & .039 \end{bmatrix} \begin{bmatrix} R \\ G \\ B \\ R^2 \\ G^2 \\ B^2 \\ RG \\ RB \\ GB \end{bmatrix} \quad \text{(E29)}$$

The precise numbers used in the transform are by way of example. The optimal numbers depend on the spectral response of the camera, the illumination source, and upon the spectra of the inks used. To one skilled in the art, different dimensions of transform matrix will be obvious, as well as the use of interpolation from a look-up table, neural networks, and model-based transforms. Numerous references to these alternative approaches are given in the above-referenced paper.

The above equations provide a model to relate the ink key settings to the measured densities of various points of an on-press image. As described, the model-based equation is differentiated with respect to the ink key settings to obtain the sensitivity factors.

A simpler embodiment can be obtained by not considering the effects of the spread of ink from one ink key zone to adjacent ink key zones. In this case, each ink key zone is treated as its own system.

In the control algorithm, each ink key zone is dealt with independently. In other words, if the camera field of view includes multiple ink key zones, the pixels for each respective ink key zone are divided out, and the comparison between acquired and target reflectance values is performed for pixels in a single ink key zone at a time.

In another embodiment of the control algorithm, each ink key would be considered separately, as described immediately above to produce a vector of ink key adjustments, $N_A$. For the Harris M1000B press, there would be 24 elements in this vector. Before the ink key moves are sent out, the ink key adjustment vector $N_A$ is multiplied by the inverse of the ink spread matrix VM. Alternate approaches for correcting for the ink spread are discussed in U.S. patent application Ser. No. 08/997,288, filed on Dec. 23, 1997, which is herein incorporated by reference. This implementation has the advantage of relative simplicity, while still compensating for the ink spread across ink key zones.

One situation where this technique may produce less than optimal results is where exact deconvolution is not possible. In these cases, it is not possible to set the ink keys in such a way that the ink (after spreading) will reach the desired levels.

For example, this will often happen near the edge between a high coverage page and a low coverage page. In order to provide sufficient ink for the high coverage page, the corresponding ink keys will be open wide. The "spill ink" from these keys may already be more ink than is needed for the low coverage page, so the ink key would need to be set to a negative level to reach the desired inking levels. This is not possible, so the deconvolution must somehow clip the results. The lack of optimal results follows from the fact that the way the clipping is done may not give optimal color.

It may also be the case that the ink spread for a given press cannot be deconvolved exactly. In this case, the deconvolution is an approximation. In essence, the deconvolution provides a compromise, that is, the closest the ink keys can come to producing the ink levels requested. Again this may not be the ink key settings that provide the closest color match.

A third case where the deconvolution process may give less than optimal color is where an approximate deconvolution is performed, probably to streamline the implementation. The lack of optimality comes in that the system does not reach exactly to the ink film thicknesses which were requested.

Another general case where deconvolution may be less than optimal is where larger ink key moves are being made, so that the assumption of linearity is weaker.

In the preferred embodiment, the ink spread will be included in the sensitivity matrix so that the effect of neighboring ink keys will be accounted for when the optimization is done. In this way, the tradeoffs inherent in the deconvolution are dealt with directly, and on the same level as the other color tradeoffs.

To achieve this, the least squares equation:

$$N_A = (S^T S)^{-1} S^T Z \quad \text{(E15)}$$

must be generalized to allow for the effect of any of the keys on any of the RGB readings. By way of example, there may be 24 ink keys for each of four ink colors. These 96 keys provide 96 unknowns.

Each of the 96 keys has some potential contribution to each of the three color components $L^*$, $a^*$, and $b^*$ at each pixel. Thus for a given pixel, there are 3 equations in 96 unknowns.

Finally, there are (for example) 480 lines of camera information with 640 pixel per line, resulting in 307,200 pixels, and 921,600 equations in 96 unknowns. The previously described techniques could be used in this case. The problem is largely an exercise in bookkeeping.

The explanation of the control system as described so far applies to FIGS. 3 and 4, and in the parlance of control systems, is a "P" loop. The change in the ink key settings will be strictly proportional to the "error signal" computed. Such a scheme will work well provided three conditions are met: 1) the model is accurate, 2) the time constant of an ink change is short compared to the cycle time of the measurement device/control system, and 3) the model is sufficiently close to linear (over the size of the correction steps) that the control algorithm not cause divergence by over-correction.

In the event that any of these conditions are not met, it is contemplated that an alternate control system include a PID loop, or utilize fuzzy logic or neural networks.

The above description of the control algorithm assumes that the comparison between the target image reflectance values and the acquired image reflectance values be performed based on the CIELAB values obtained by the camera, and that the least squares procedure be performed in this space. Improvements to the system may be possible by incorporating some processing on the image data. For example, an improvement in accuracy may be obtained when the images from the camera are corrected for degradations typical of video cameras, as described in U.S. Pat. No. 5,724,259. It is further contemplated that comparisons be performed in RGB space, in XYZ space, in CIELUV, in CMC space or in any other applicable color space.

There is another effect of the human visual system that can be taken into account by the control algorithm. This is the effect that adjacent colors have on each other's appearance.

It was previously suggested that the nonlinearity of the inking system model may cause divergence in the case of a "P" control loop. This stems from the fact that the whole control system is based on the linearization of the model about a present state of the system. This linearization is reflected in the sensitivity matrix. Implicitly, the assumption is made that a given unit of ink key change will result in a given unit of change in color (multiplied by the appropriate entry from the sensitivity matrix), and that ten given ink key change units will yield ten units of change in color.

The basic problem is that the sensitivity matrix, S, depends on the ink key setting, N. Because of this, the overdetermined linear equation X, which was relatively simple to solve, is rendered considerably more difficult:

$$S(N)N_A = Z \qquad (E30)$$

While the assumption that the derivatives in the sensitivity matrix are reasonably constant applies well for small corrections, it may not apply for larger corrections. There is a possibility that, because of a change in the value of the derivative, the control system may overshoot. This can lead to increased divergence time or oscillations.

One solution to the problem of instability during large corrections is to reduce the gain of the control system. In other words, if the calculations suggest a one unit increase in the ink key opening, the control system may conservatively make only a one-half unit change. The system will make another small move on the next pass, and so on. Stability is traded for a slower convergence time.

Alternately, the process of making multiple small steps could be simulated. The model can be used to estimate what the image would look like were a one tenth unit change to be made (for example). This estimated image is compared to the target image, and a second change is computed. Another image estimate is generated and the process is repeated. One criteria for stopping the iteration is when the difference between target and estimate image is below a predetermined amount. The actual ink key move generated is then the sum of all the individual moves. This process is a rudimentary process of nonlinear minimization. More sophisticated techniques, such as Powell's method, are also available.

Potential difficult situations for the control system include impossible requirements. It is possible to attempt to print images where it is not possible to reach target colors all across the image. Thus, it will not be possible to match the proof. The following section lists three common impossible requirements, and describes measures to ensure optimal results under each.

A standard "impossible requirements" situation occurs when two conflicting pictures appear inline with each: for example a cherry-red car and a caucasian face. The cherry red of the car is produced with yellow and magenta ink. Unfortunately, the magenta ink that is often used is not a particularly pure magenta, making a good solid red difficult to produce on press. The best that can be done is to increase the magenta ink. Increasing the magenta ink will unfortunately make any faces that are inline with the car too red. The algorithm as described so far will automatically strike a balance between the reds and the fleshtones.

Another "impossible requirements" situation occurs when there is one set of ink key zones with high coverage that abut a set of ink key zones with low coverage. The ink keys corresponding to the high coverage area will be opened wide. As a result, there will be a considerable amount of ink spread to the low coverage areas. There is a potential for there to already be more ink than is needed, just from the ink spread. Thus, the control algorithm would attempt to move the low coverage ink key to a negative setting.

A simple clipping technique, which does nothing more than set negative values to zero, will not be optimal. The optimal solution would recognize that a balance must be achieved between making the high coverage area dark enough and making the low coverage area light enough. Clipping, in this example, ignores the needs of the low coverage area.

A preferable means for avoiding ink keys out of range is "vector clipping". If one of the neighbor keys (or the key itself) runs into a boundary, the whole vector is scaled so that none of the keys will clip. This will have the beneficial effect of gradually tapering the transition. Some smoothness is imposed on the overall densities at the expense of not getting as accurate a density in the high coverage area as is possible. This smoothness is visually less objectionable than rapid changes.

The third impossible requirements situation is where the target is a color that just cannot be printed within the gamut of available inks, such as hot pink, a black that is too dark to be printed, or a color such as teal or deep red. In the case of printing the dark black, the closest solution (at least in terms of the least squares result) is to add as much ink as can be added to the web. This solution unfortunately has the side effect of making the shadows indistinguishable. The coverage areas between 75% and 90% coverage will be indistinguishable from the solids. Thus, all detail is lost in the dark region. A better match in terms of color perception may be possible.

One means to achieve a closer match in terms of color appearance is to use a different metric to perform the approximate solution to $SN_A = Z$. In equation 15 (E15), the least squared difference metric is used. A better metric in terms of color appearance matching is to seek to maximize the correlation coefficient between $S$, $N_A$ and $Z$:

$$\min_{N_\Delta}\left[\frac{\sum_{i=1}^{n}(A_i - a_M)(T_i - t_M)}{n\sigma_A\sigma_T}\right] \quad (E31)$$

where

A=M+SN$_A$, is the approximation of the color measurements with a change of N$_A$ in the ink keys, M being the current measured color values and S being the sensitivity matrix, $a_M$ is the mean value for A, $\sigma_A$ is the standard deviation of A, T is the target color values, $t_M$ is the mean value for T, $\sigma_T$ is the standard deviation of T, and n is the number of elements (color values) of T and A.

Minimization of the above equation can be performed using standard algorithms such as Levenberg-Marquardt.

A second means to achieve a closer match in terms of color appearance is to mimic the processing that occurs in the human visual system. After the measured and target images have been converted to CIELAB or some other suitable color space, each individual image (L*, a*, and b*) is spatially filtered with a filter that approximates the visual system, such as the difference of Gaussian function. A suitable approximation to this may be to subtract from the image a fixed constant times the average of the image.

The resulting images that have been compensated for visual appearance effects may be processed either by the least-squares method or by the maximization of correlation coefficient method.

It is understood that the invention is not confined to the particular construction and arrangement of parts herein illustrated and described, but embraces all such modified forms thereof as may come within the scope of the following claims. It will be apparent that many modifications and variations are possible in light of the above teachings. Therefore, it is to be understood that within the scope of the appending claims, the invention may be practiced other than is specifically described. Alternative embodiments and variations of the method taught in the present specification may suggest themselves to those skilled in the art upon reading of the above description.

What is claimed is:

1. A method for controlling a plurality of ink control devices on a printing press, the press operating to repetitively print an image on a substrate, the ink control devices each controlling the amount of ink supplied to a respective ink key zone on the substrate, the method comprising the steps of:

measuring color values for a plurality of pixels of a selected image printed on the substrate to produce an acquired image array, aligning the acquired image array with a target image array comprised of target color values for the plurality of pixels, comparing the acquired image array with the target image array on a pixel by pixel basis, determining a matrix equation linking ink control device adjustments to changes in color values of the image printed on the substrate via sensitivity factors for each of the plurality of pixels, obtaining a least squares solution to the matrix equation to determine ink adjustments for each ink key zone, and communicating the ink adjustments to the ink control devices.

2. The method as recited in claim 1, wherein the step of measuring color values for a plurality of pixels of a selected image printed on the substrate includes using a color video camera to acquire the color values.

3. The method as recited in claim 2, wherein the color video camera has red, green and blue color channels.

4. The method as recited in claim 2, wherein the color video camera has a field of view greater than 25 cm by 25 cm.

5. The method as recited in claim 1, wherein the step of measuring color values for a plurality of pixels of a selected image printed on the substrate includes using a linear CCD array with a plurality of color filters.

6. The method as recited in claim 1, wherein the color values are one of the group including reflectance, optical density, CIELUV and CIELAB values.

7. The method as recited in claim 1, wherein the step of aligning the acquired image array with a target image array includes cross-correlating the acquired image array with the target image array.

8. The method as recited in claim 1, wherein the step of aligning the acquired image array with a target image array includes dividing the acquired image array and the target image array into sub-image portions, and cross-correlating respective acquired image array sub-image portions with corresponding target image array sub-image portions.

9. The method as recited in claim 1, wherein the step of determining a matrix equation linking ink control device adjustments to changes in color values includes determining a model-based equation for the printing press and determining the sensitivity factors for each of the plurality of pixels by differentiating the model-based equation.

10. The method as recited in claim 9, wherein the ink control devices control the amount of ink supplied to respective zones of a first roller, ink is transferred from the first roller to a roller train and then to the substrate to print an image, the roller train includes a plate cylinder and a vibrator roller that moves back and forth in a lateral direction with respect to the longitudinal direction of movement of the substrate, and wherein determining a model-based equation for the printing press includes determining an ink key distribution function which relates the amount of ink supplied by a single ink control device to the distribution of ink on the substrate in a plurality of affected ink key zones due to the lateral movement of the vibrator roller.

11. The method as recited in claim 10, wherein determining a model-based equation for the printing press includes determining a non-proportional plate coverage relationship which relates a plate coverage value to the corresponding ink film thickness on the plate cylinder needed to obtain a predetermined ink film thickness on the substrate.

12. The method as recited in claim 11, wherein determining a model-based equation for the printing press includes determining an ink saturation density function which relates the optical density of ink on the substrate to the ink film thickness on the substrate.

13. The method as recited in claim 9, wherein the ink control devices control the amount of ink supplied to respective zones of a first roller, ink is transferred from the first roller to a roller train and then to the substrate to print an image, the roller train includes a plate cylinder, and wherein determining a model-based equation for the printing press includes determining a non-proportional plate coverage relationship which relates a plate coverage value to the corresponding ink film thickness on the plate cylinder needed to obtain a predetermined ink film thickness on the substrate.

14. The method as recited in claim 9, wherein the ink control devices control the amount of ink supplied to respective zones of a first roller, ink is transferred from the first roller to a roller train and then to the substrate to print an image, the roller train includes a plate cylinder, and wherein determining a model-based equation for the printing press includes determining an ink saturation density function which relates the optical density of ink on the substrate to the ink film thickness on the substrate.

* * * * *